July 2, 1968  KOREHARU TAKAMATSU ET AL  3,390,643
RAILWAY TRUCK WITH DAMPENED SPRING BOLSTER
Filed Aug. 25, 1965  3 Sheets-Sheet 1

Koreharu Takamatsu
Isao Kikuchi
INVENTORS

Watson, Cole, Grindle & Watson
BY
ATTORNEYS

United States Patent Office 3,390,643
Patented July 2, 1968

3,390,643
RAILWAY TRUCK WITH DAMPENED
SPRING BOLSTER
Koreharu Takamatsu, Mino, and Isao Kikuchi,
Nishinomiya, Japan, assignors to Sumitomo
Metal Industries Limited, Osaka, Japan, a corporation of Japan
Filed Aug. 25, 1965, Ser. No. 482,518
Claims priority, application Japan, Aug. 29, 1964,
39/49,189; Mar. 31, 1965, 40/19,122
2 Claims. (Cl. 105—197)

ABSTRACT OF THE DISCLOSURE

This invention relates to a friction snubber which is used in a freight car bogie truck. The bogie truck includes side frames within which is a bolster mounted on springs which are in turn mounted on the frame. Friction shoes are slidably mounted in the bolster for frictional engagement with the side frames and the force with which the friction shoes engage the side frames is controlled by a wedge member itself supported by a spring mounted on the side frame. Increased weight in the freight car tends to compress the spring and thus bias the wedge forcing the friction shoes more strongly against the side frame. Perpendicular raised guides are located in the inclined surfaces of the wedge which engage complementary surfaces on the friction plate thereby maintaining a normal perpendicular relationship between the wedge and shoes and prevent transverse movement therebetween even where extreme pressures are involved.

---

This invention relates to a friction snubber for damping the vibration of a freight car bogie truck.

There are two different types in the friction snubber heretofore in use, one type being constant in friction force irrespective of carrying load, and the other type being variable in friction force in proportion to carrying load. In the case of a friction snubber of the constant type, friction shoes and friction shoe springs are incorporated into a swing bolster and an inclined surface formed on the swing bolster is used to press the friction shoes against a side frame for obtaining friction force. According to this device, an increase in carrying load travels bolster springs but friction force is constant. In damping of vibration, however, there is an effective degree of friction force proportionate to carrying load. If friction force is small in spite of carrying load being large, the damping effect of vibration is small. And conversely if friction force is larger in proportion to carrying load, the intended effect of bolster springs is reduced and there is a possibility of shock from the rail being transmitted direct to the car body. Consequently this type cannot be said to be suitable for obtaining effective friction force proportionate to carrying load. Therefore, the variable type is considered effective, but the device of this type heretofore in use has made it necessary to form on the swing bolster an inclined surface to guide friction shoes and to provide a guide to prevent the friction shoes from swinging out laterally. The provision of such means involves structural difficulties and has much to do with the entire efficiency of the snubber. Moreover, as an individual friction spring must be provided for each of two friction shoes, so much the larger space is sacrificed and difficulties arise as to the arrangement of bolster springs.

The present invention eliminates the drawbacks of the kind described and provides a snubber of an improved type. That is to say, the friction snubber provided by the invention is one applied to a freight car bogie truck comprising a shoe liner provided on both sides of a swing bolster supported by bolster springs in a side frame, a pair of friction shoes fitted in said shoe liner slidably and in co-axial relation with each other, and a wedge supported by the side frame through a friction shoe spring and fitted between the inclined surfaces formed on the inside ends of the friction shoes, so that friction force may be changed in proportion to carrying load under the wedge action of the inclined surfaces of the friction shoes and the wedge.

The object of the invention is to provide a friction snubber wherein the shape of the end of the swing bolster into which friction shoes are fitted is simplified and the construction of the swing bolster is facilitated and wherein the operation of two friction shoes by a wedge supported by one friction shoe spring can reduce the size of the device.

The invention will be described with reference to the accompanying drawings in which.

Figure 1:
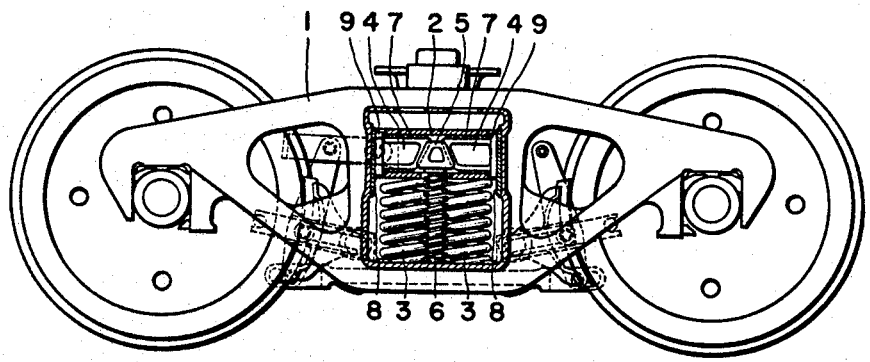
FIG. 1 is a side elevational view taken along line I—I of FIG. 2 showing part of a freight car bogie truck to which is applied a device according to the invention, and shows a state and relation in which the device of the invention is fitted in the bogie truck.
Figure 2:
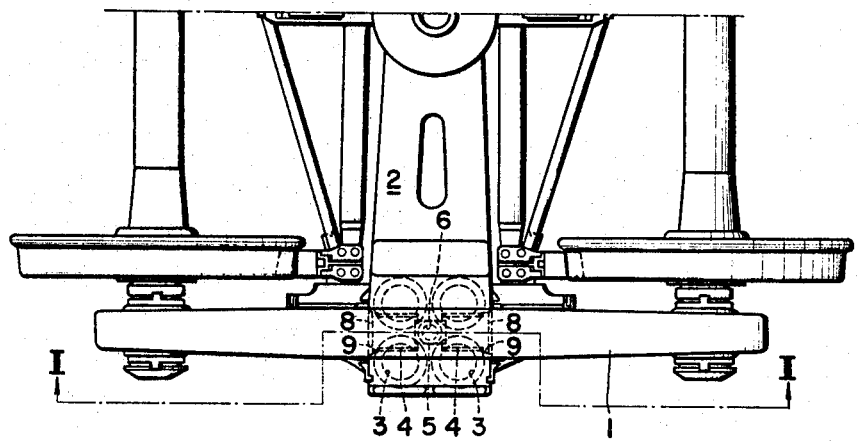
FIG. 2 is a plan view showing an exact half cut along center line of FIG. 1.
Figure 3:
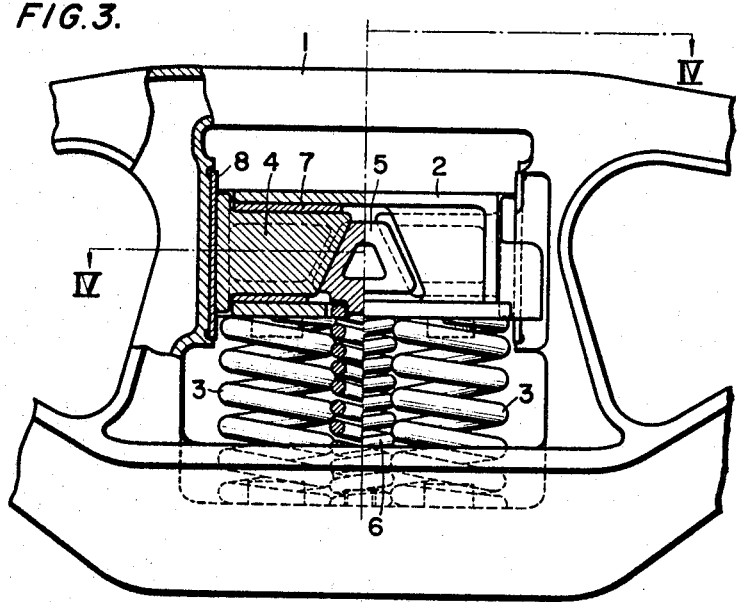
FIG. 3 is a side elevational view taken along the line III—III of FIG. 4 showing on an enlarged scale part of the device according to the invention.
Figure 4:
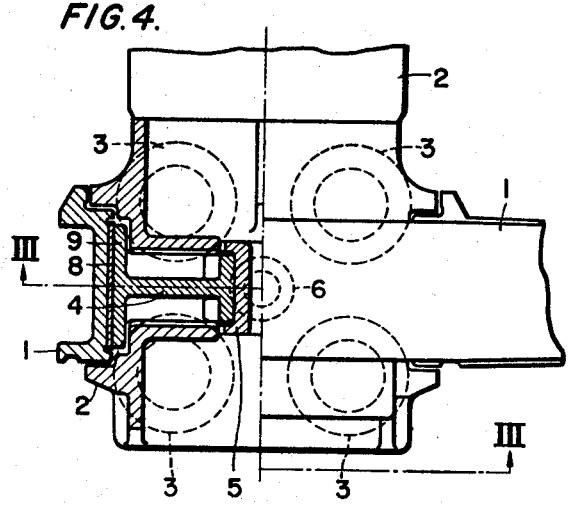
FIG. 4 is a plan view taken along line IV—IV of FIG. 3.
Figure 5:
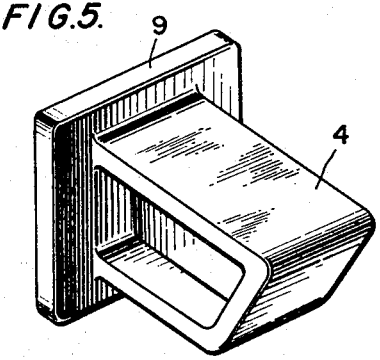
FIG. 5 is a perspective view showing only friction shoes of the device described above.
Figure 6:
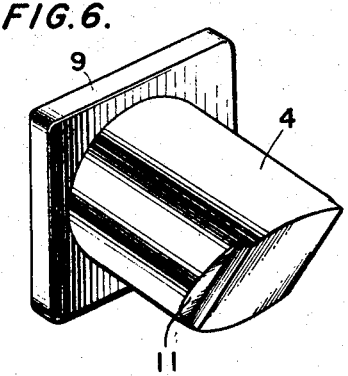
FIG. 6 is a perspective view of a modification of the friction shoes.
Figure 7:
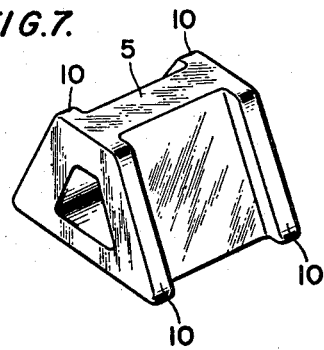
FIG. 7 is a perspective view of a wedge used in the invention.

Referring now to FIG. 3, two right and left fitting portions are formed at both ends of a swing bolster 2 supported by bolster springs 3 in a side frame 1, or if necessary, shoe liners 7, 7 having the property of abrasion resistance and low friction coefficient are provided on the fitting portions, and friction shoes 4, 4 whose outside end surfaces are in contact with friction plates 8, 8 fixed to the side frame 1 and whose inside end surfaces are formed into inclined surfaces are fitted into shoe liners 7, 7 slidably and in co-axial relation with each other. Said friction shoes 4, 4 as shown in FIG. 5 are formed into an H-shape in section and have a flange 9 formed on the side that contacts with the friction plates 8, 8 so as to increase an area of contact with the friction plates 8, 8. And a modification of the friction shoes 4, 4 as shown in FIG. 6 is round in section. As apparent from this, the sectional profile of the friction shoe 4 may be selected as desired, namely many different shapes such as a special shape like an H-shape, round shape, square shape, equilateral poligonal shape or the like in accordance with the construction of swing bolster or the finishing of the fitting portion. However, the friction shoe 4 of an H-shape shown in FIG. 5 serves to reduce the weight of the friction shoe 4 and that of round shape in section shown in FIG. 6 can facilitate working of the end portion of the swing bolster into which the friction shoes are fitted. Each shape has its own advantage.

A wedge 5 is fitted between inclined surfaces formed in opposition to each other at the inside end of each of the friction shoes 4, 4 fitted in the fitting portions or inside the shoe liners 7, 7, said wedge 5 being supported by a friction shoe spring 6 in the side frame 1. Consequently the wedge 5 is subjected to upward thrust under the action of the friction shoe spring 6, a wedge action that arises between the inclined surfaces of the friction shoes 4, 4 and the inclined surfaces of the wedge presses normally the friction shoes 4, 4 outwardly into contact with the friction plates 8, 8 of the side frame 1, whereby friction between the friction shoe 4 and the friction plate 8 produces friction force which damps shock when it comes.

As described above, the friction shoe 4 is pressed against the friction plate 8 of the side frame 1 by the wedge action of the wedge 5, but in order to prevent the position of the friction shoe 4 with respect to the position of the wedge 5 from deviating transversely from each other owing to the shock transmitted, guides 10, 10 are provided on the inclined surfaces of the wedge 5, i.e., on both sides of the inclined surfaces in contact with the friction shoe 4, so that both sides of the friction shoe may be fitted into the cavities formed on the guides 10, 10. Consequently, in the case of the friction shoe 4 of a round shape in section shown in FIG. 6, both sides of the end of the surfaces which are in contact with the wedge 5 are cut perpendicularly to form a step 11 so that the inclined surfaces may engage with the cavities of the wedge 5.

As described above, the invention is designed to create friction force between the friction shoe 4 and the friction plate 8 and consequently the coefficient of friction between the friction shoe 4 and the fitting portion of the swing bolster 2 or shoe liner 7 and the coefficient of friction between the friction shoe 4 and the wedge 5 are designed to be as small as possible. For this purpose it is desirable to make the surface of contact of those portions smooth or apply a lubricant thereto or use a material of low coefficient of friction in the production of the shoe liner 7.

As the friction shoe spring 6 is fitted in parallel to the bolster spring 3, the spring force of the friction shoe spring is increased in proportion to increased carrying load, and friction force varies in proportion to carrying load. And where necessary, imparting of initial compression to the friction shoe spring 6 is not objectionable.

As described above, the invention makes it possible not only to simplify the end profile of the swing bolster into which the friction shoes are fitted, but also to simplify the assembling of the friction shoes and their related sliding members, with the result that the trouble of finishing of various members can be greatly saved. The sectional profile of friction shoes can be modified in various ways, and such various shapes as round, square and other shapes can be used and a free choice of shape can be made in accordance with the shape of a swing bolster. And the operation of two friction shoes by means of one wedge helps reduce the space occupied by the friction shoes and offers an advantage in the arrangement of bolster springs.

While a preferred embodiment of the invention has been described using specific terms, such description is for illustrative purposes only, and it is to be understood that changes and variations may be made without departing from the spirit or scope of the following claims.

What is claimed is:

1. In a freight car bogie truck comprising a side frame having spaced columns, each of said columns having a friction plate secured thereto, a bolster spring-supported between said columns, friction shoes slidably mounted in opposite sides of said bolster and having outer end portions which are in frictional engagement with respective friction plates, a movable wedge in said bolster, the inclined surfaces of which are in engagement with the inner end surfaces of said friction shoes opposite said friction plates, auxiliary spring means supported on said side frame and engaging said wedge for biasing said wedge and thereby forcing said friction shoes against said friction plates with a pressure dependent upon the weight of the load in said freight car, the improvement comprising a groove in each of the inclined surfaces of said wedge receiving the inner end surfaces of said shoes, the sides of each of said grooves forming guides for said shoes perpendicular to the surface of said groove, whereby said wedge and shoes are maintained in normal perpendicular relationship and transverse movement therebetween is prevented.

2. A freight car bogie truck as claimed in claim 1 wherein said friction shoes are slidably mounted in said bolster along a substantially horizontal plane.

References Cited

UNITED STATES PATENTS

| | | | |
|---|---|---|---|
| 2,141,767 | 12/1938 | Camp | 105—197 |
| 2,569,950 | 10/1951 | Quinn | 105—197 |
| 2,570,159 | 10/1951 | Schlegel | 105—197 |
| 2,548,223 | 4/1951 | Lehrman | 105—197 |
| 2,550,910 | 5/1951 | Christenson | 105—197 |

ARTHUR L. LA POINT, *Primary Examiner.*

H. BELTRAN, *Assistant Examiner.*